(12) United States Patent
Peskin et al.

(10) Patent No.: US 9,864,578 B2
(45) Date of Patent: Jan. 9, 2018

(54) TECHNIQUES FOR DISTINGUISHING RESPECTIVE USER INPUT COMMANDS AS DIRECTED TO MEDIA PLAYER AND PROGRAM FOR DISPLAYING WEB PAGES

(71) Applicant: StreamZap, Inc., Hood River, OR (US)

(72) Inventors: Jonah Peskin, Hood River, OR (US); Robert Richmond, Seattle, WA (US)

(73) Assignee: StreamZap, Inc., Hood River, OR (US)

( * ) Notice: Subject to any disclaimer, the term of this patent is extended or adjusted under 35 U.S.C. 154(b) by 222 days.

(21) Appl. No.: 14/804,205

(22) Filed: Jul. 20, 2015

(65) Prior Publication Data

US 2016/0371055 A1    Dec. 22, 2016

Related U.S. Application Data

(60) Continuation of application No. 13/854,895, filed on Apr. 1, 2013, now Pat. No. 9,086,786, which is a
(Continued)

(51) Int. Cl.
*G06F 3/00* (2006.01)
*G06F 3/16* (2006.01)
(Continued)

(52) U.S. Cl.
CPC ............ *G06F 3/167* (2013.01); *G06F 3/0227* (2013.01); *G06F 3/0484* (2013.01);
(Continued)

(58) Field of Classification Search
CPC .................................................. G06F 3/0227
(Continued)

(56) References Cited

U.S. PATENT DOCUMENTS 5,881,318 A * 3/1999 Liebenow ............... G06F 3/023
710/67
5,900,867 A * 5/1999 Schindler ............. G06F 3/0213
345/169

(Continued)

Primary Examiner — William Titcomb

(57) ABSTRACT

Computer software allowing enhanced control of the playout of audio/video works on a computer system. In various embodiments, the software allows key events from dedicated audio/video keys, whether part of a full sized keyboard or on a hand held remote, to control the actions of an audio/video playout program without requiring the user to direct the key event focus of the operating system to the audio/video playout program. Also, the invention distinguishes between key presses from a local, full sized keyboard and key presses from a remote keyboard so that the audio/video playout program can enlarge its screen display when a key event is received from the remote keyboard. In one embodiment, the invention constantly instructs the operating system to move the focus to the audio/video playout program. In another embodiment, if the focus is received by any of various windows in a display, software associated with the window forwards to the audio/video playout program any key events received from audio/video keys. In a third embodiment, audio/video key event data is routed to the audio/video playout program by a method that does not use the key event features of the operating system, such as by using a key board wedge server program to serve key events to audio/video client programs. In a fourth embodiment, the operating system is modified so that it has two separate focuses, one for a text keyboard and a second focus for audio/video keys.

28 Claims, 5 Drawing Sheets

Wedge Server and Event Client Programs

Related U.S. Application Data continuation of application No. 11/166,319, filed on Jun. 24, 2005, now Pat. No. 8,418,062, which is a division of application No. 09/716,052, filed on Nov. 17, 2000, now Pat. No. 6,976,216.

(51) Int. Cl.
  *G06F 3/0489* (2013.01)
  *G06F 3/0484* (2013.01)
  *G06F 3/0488* (2013.01)
  *G06F 3/02* (2006.01)

(52) U.S. Cl.
  CPC ...... *G06F 3/04847* (2013.01); *G06F 3/04886* (2013.01); *G06F 3/04897* (2013.01)

(58) Field of Classification Search
  USPC .......................................................... 715/719
  See application file for complete search history.

(56) References Cited

U.S. PATENT DOCUMENTS

| | | | | | |
|---|---|---|---|---|---|
| 5,948,084 A | * | 9/1999 | Ha | .......... | G06F 13/385 710/46 |
| 6,005,563 A | * | 12/1999 | White | .......... | G06F 3/0236 348/E5.002 |
| 6,006,285 A | * | 12/1999 | Jacobs | .......... | G06F 3/0605 710/14 |
| 6,034,689 A | * | 3/2000 | White | .......... | G06F 3/0236 348/E5.002 |
| 6,097,520 A | * | 8/2000 | Kadnier | .......... | G08C 19/28 348/734 |
| 6,188,401 B1 | * | 2/2001 | Peyer | .......... | G06F 17/30899 707/E17.119 |
| 6,313,851 B1 | * | 11/2001 | Matthews, III | .......... | G06F 3/0481 348/E5.103 |
| 6,323,873 B1 | * | 11/2001 | Liebenow | .......... | G06F 3/04897 345/619 |
| 6,346,934 B1 | * | 2/2002 | Wugofski | .......... | G06F 3/002 345/158 |
| 6,529,219 B1 | * | 3/2003 | Baik | .......... | G06F 1/1616 715/827 |
| 6,539,437 B1 | * | 3/2003 | Windheim | .......... | G06F 9/542 348/552 |
| 6,976,216 B1 | * | 12/2005 | Peskin | .......... | G06F 3/04897 345/169 |
| 7,165,213 B1 | * | 1/2007 | Busey | .......... | H04L 12/1813 709/202 |
| 8,418,062 B2 | * | 4/2013 | Peskin | .......... | G06F 3/04897 715/716 |
| 9,086,786 B2 | * | 7/2015 | Peskin | .......... | G06F 3/04897 |
| 2005/0235210 A1 | * | 10/2005 | Peskin | .......... | G06F 3/04897 715/716 |

\* cited by examiner

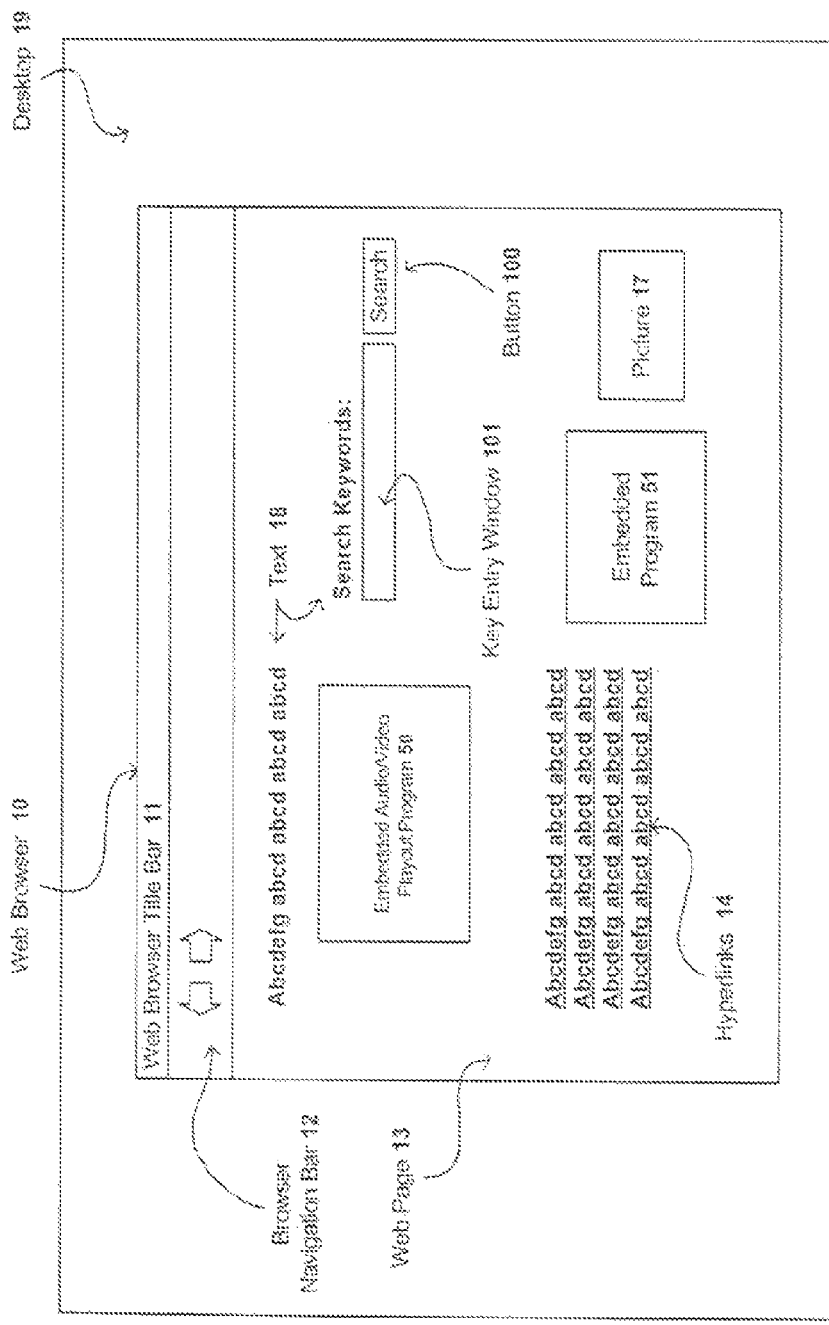
Figure 1. Web Browser With Embedded Audio-Video Play Out Program And Other Web Page Constituents

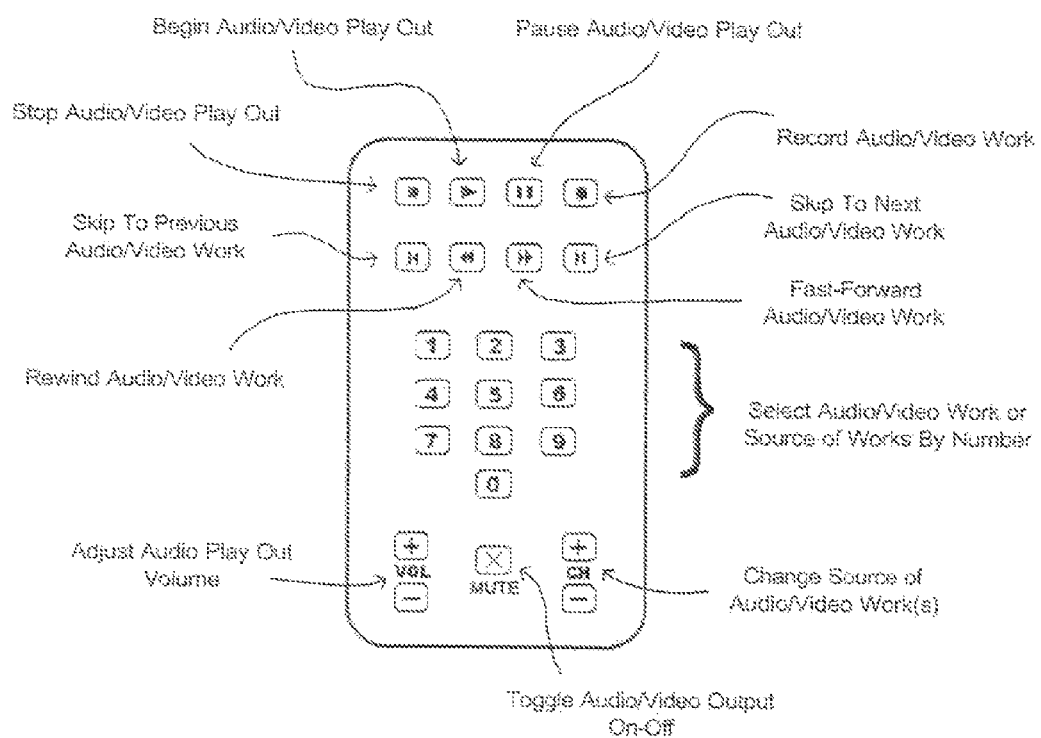
Figure 2. Hand-Held Keypad With Audio/Video Play Out Control Keys

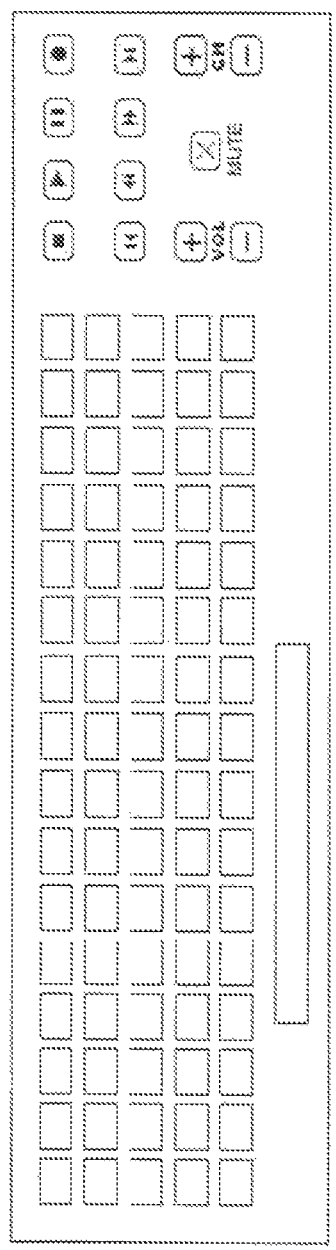
Figure 3. Standard Keyboard With Audio/Video Play Out Control Keys

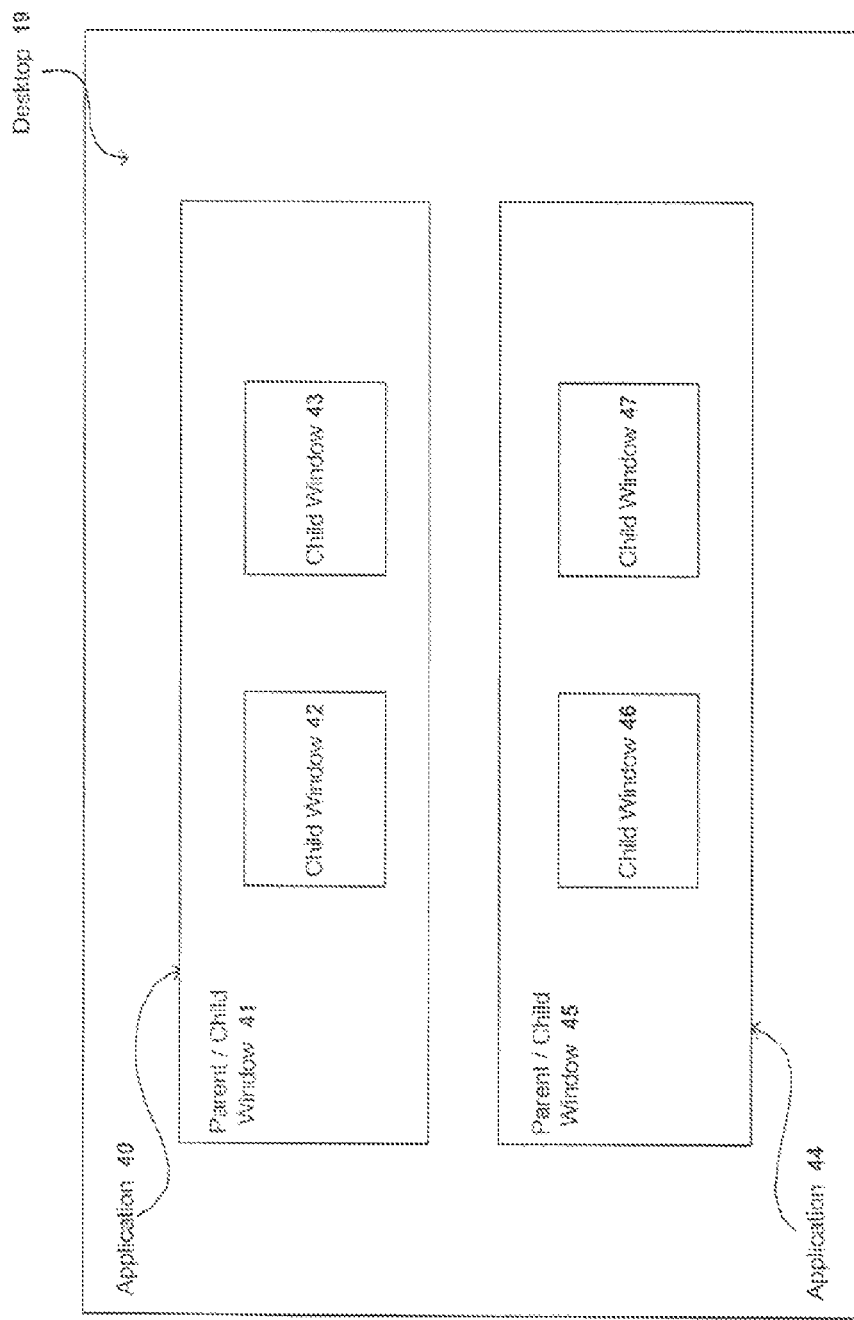
Figure 4. Program Window Hierarchy on Modern Operating Systems

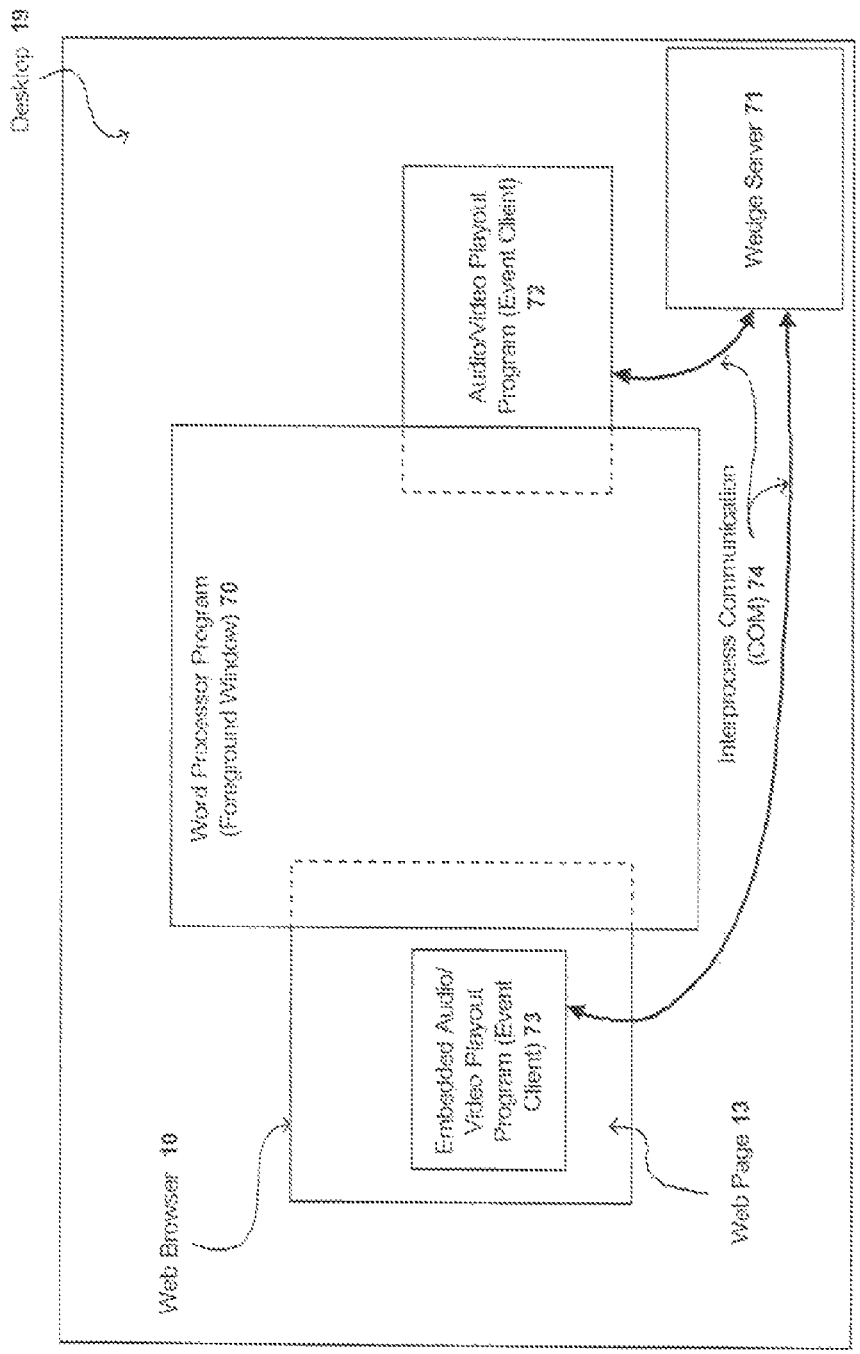
Figure 5. Wedge Server and Event Client Programs

TECHNIQUES FOR DISTINGUISHING RESPECTIVE USER INPUT COMMANDS AS DIRECTED TO MEDIA PLAYER AND PROGRAM FOR DISPLAYING WEB PAGES

This application is a continuation of U.S. Ser. No. 13/854,895 and claims priority from Ser. No. 09/716,052 filed Nov. 17, 2000, issued as U.S. Pat. No. 6,976,216.

FIELD OF INVENTION

This invention relates to use of dedicated audio/video control keys on computing devices that execute programs for playing audio or video works.

BACKGROUND

Since compact disc drives were added to personal computers many years ago, personal computers have been used for playing first audio and then video works of authorship. The common implementations use either a mouse or a standard text keyboard to control the playout software. If a mouse is used, images of buttons for some of the customary playout control functions (play, stop, pause, fast forward, rewind, skip to next or last track, volume, mute, and change channel) are displayed on the screen. The mouse controls cursor movement, and a click of the mouse when the cursor is over a button causes the playout software to control the playout accordingly. If a standard text keyboard is used, keys of the keyboard will be selected for each of the control functions listed above, such as "P" for play and right and left arrows for fast-forward and rewind. The audio/video playout control software is typically loaded to the computing device from a transportable disc or may be downloaded across a network for installation or may be embedded in a markup language page such as with use of a Java applet or ActiveX control embedded in an HTML page which is transparent to the user and requires little to no action by the user to install or begin execution of the software.

Users of computer systems to play audio/video works can add remote control devices such as those commonly used for televisions or for audio stereo systems to allow control of the playout of audio/video works from anywhere in the same room. Radio or infrared receiving devices for such remote controls can be added to an input port on the computer, such as a USB (Universal Serial Bus) port. Then, a specialized audio/video work playout program is added which includes instructions to receive keystroke data through the port and interpret said data in order to recognize remote control key presses. This allows the remote key presses to effect audio/video playout according to which key is pressed.

As audio/video playout programs became commonplace on personal computers, it became desirable to be able to control a wide variety of audio/video control programs that are designed for text keyboard input using a hand-held remote. To accomplish this, special software (sometimes called a "wedge") can be installed on the computer to control communications through the port, receive keystroke data from the remote control, translate the keystroke data to standard text keystroke data such as "P" for play, and provide the standard keystroke data to the operating system which provides it to the playout control software. Thus, with the remote control added to the computer system and the special control software installed, the remote control can simulate keystrokes at the text keyboard to control audio/video playout control software designed for receiving text keyboard input. Then the user can control the audio/video playout control software using either the text keyboard or the remote control.

There are two serious deficiencies with this system. First, the system can no longer use for their original intended purpose the standard text keys that are used to indicate audio/video playout control. For example, a playout control program that uses "P" to indicate "pause playout" or left and right arrows to indicate "previous audio/video work" or "next audio/video work" are not able to use these same keys to allow the user to type a music artist or song name into an edit box. Second, the translator program must be tailored to work with differing varieties of audio/video playout programs, all of which use differing keys to represent each playout control action.

Newer operating systems, such as Microsoft's Windows 2000, address these problems by creating a standard set of key codes that are passed to applications when a playout control key is pressed. These standard key codes are used specifically for keyboards or other input devices with dedicated keys for playout control purposes. This method carries the advantage that any application can be easily made to recognize playout control key presses.

This approach still suffers from deficiencies because the operating system delivers each playout control key press event to software programs in the same way that a text keyboard key event would be delivered. Specifically, if a user presses a key when several software programs are running, the operating system must determine which one of those applications is to receive the notification of key-press, or "key event". The existing approach is to send key press information only to the application window with which the user is actively interacting. This approach makes sense for most applications, but audio/video playout control applications—in particular, audio player programs—are an exception.

It is a common occurrence to simultaneously execute an audio/video playout program and another program that demands user input, such as a word processor. Typically the audio/video playout program is run in the background because it requires less user attention to operate. However, because existing systems send keystrokes to the foreground program, the user must explicitly select the audio/video program to be the foreground program (usually by moving the mouse over the audio/video playout program window and clicking the mouse), before being able to send audio/video playout key-press events to the audio/video playout program. This adds an additional, inconvenient and unnecessary step to audio/video playout program operation.

The requirement that the user must specifically select the audio/video playout control application to perform audio/video playout control is particularly confusing to the user when presented with a web page that consists of a markup language with one or more embedded applications. In this case, though the user is presented with what appears to be a single web application, it is in reality a conglomerate of one or more applications as well as text, graphics, and user interface items such as checkboxes or text boxes where one may provide input using the keyboard or mouse. On the web page, in order to control the audio/video playout application, the user must select the portion of the web page that displays the playout application to place it in the "foreground" before being able to press a playout control key that will control the embedded audio/video playout program. Furthermore, if the user were to click on any other web page constituents, the playout application would no longer receive keyboard events, preventing the user from using the dedicated audio/video keys to control audio/video playout.

In modern operating systems, where multiple computer programs may operate concurrently as one or more "windows" on a screen, or as one or more "child" windows of a web browser, standard keyboard-press events are communicated by the operating system to the window that has the "keyboard focus" (is in the "foreground"). The keyboard focus is typically assigned by the user to a window by placing the mouse cursor over a window and clicking a mouse button. If the assigned window is a window where the user can type text, often a flashing text cursor can be seen in the window that has the keyboard focus. Windows that do not have flashing text cursors typically indicate visually that they have the keyboard focus by changing the color of the application's primary window's title bar.

On existing computers equipped with a common (text) keyboard as well as dedicated keys for audio/video playout control (sometimes on a wireless hand-held remote), such dedicated audio/video control key-presses are communicated to the application window that has the keyboard focus, just as are standard key presses. Alternatively, the operating software delivers audio/video key events only to a specialized set of programs customized for the device.

SUMMARY

This invention comprises systems that enable a software program to receive audio/video key events without requiring the user to explicitly direct the keyboard focus to the playout program. The invention simplifies the user interface because it allows audio/video playout buttons to control a web-embedded audio/video player even if the user has not explicitly set the keyboard focus within the web page to that audio/video player.

Note that though the figures in this document indicate that the audio/video playout window is visible to the user at all times, it is a common technique to hide a program window by specifying dimensions of zero width and zero height for the program's window. In this case, the inventions as described are still effective, and indeed more important because the user has no clear way to set the keyboard focus to the application by using the mouse or keyboard.

The invention includes methods that allow a computer user to communicate audio/video key events to applications that do not have a window in the foreground. This is accomplished by creating two keyboard focuses: one for regular text input and a second for audio/video keyboard input. By having two separate keyboard focuses, the user may assign the audio/video keyboard focus to any playout program that may be running in the foreground or background on the computer. The user may then set the text keyboard focus to any other computer program, without affecting the placement of the audio/video keyboard focus. Furthermore, the user may reassign the audio/video keyboard focus to another executing playout program at any time. Additionally, the user may enter a default mode, whereby the audio/video focus window is the same as the text keyboard focus window. This frees the user from thinking about multiple keyboard focuses when their usage is not required.

Another shortcoming of existing systems that is addressed by this invention is the need for playout programs to be able to determine whether the user has pressed a playout control key on a keyboard that is typically used at short range (such as a typing keyboard) or on a keyboard that is typically used at long range (such as a hand-held remote). This is desirable because a program may be better suited to different modes of operation when the user presses audio/video control buttons on a hand-held remote. For example, it is desirable to temporarily display text in an enlarged font if the user presses buttons on a hand-held remote, because presumably the user is operating the computer from a distance that makes regular screen text viewing difficult. This is accomplished by delivering, along with key event notification data, an indication of whether the key was pressed on a short-range keyboard or a long-range keyboard. Alternatively, a new set of distinct codes may be used to identify each long-range keyboard key.

The invention is most useful on computers equipped with specialized keyboards that have audio/video playout keys or on computers that have an auxiliary audio/video keyboard ("handheld remote") to control audio/video playout programs. However, many of the embodiments described are useful on computer systems with playout programs that use regular text keys ("P" for Play, "S" for Stop, "Up Arrow" for Volume Up) that are dedicated to controlling audio/video playout.

BRIEF DESCRIPTION OF THE DRAWINGS

FIG. 1 is a diagram of a web browser displaying typical web page constituents.

FIG. 2 is a top view of a hand-held keypad whose keys consist only of audio/video playout control keys.

FIG. 3 is a top view of a traditional keyboard with the addition of specialized audio/video playout control keys.

FIG. 4 is a diagram of program window hierarchy on a modern operating system "desktop" display.

FIG. 5. is a diagram of the communications between a "wedge server" program that is added to an operating system to enable an auxiliary audio/video keyboard focus, and the "event client" programs that receive audio/video key events from the wedge program by the Microsoft COM protocol.

DETAILED DESCRIPTION

It is common to create a web page that is composed by a markup language and/or scripting language that specifies the arrangement of web page "constituents": text, images, hyperlinks, keyboard or mouse input boxes, audio/video works, and embedded applications such as Java applets or ActiveX controls. FIG. 1 shows a block diagram of an example web page 13 as displayed in a web browser display window 10.

For the purposes of the present invention, a web browser is any computer application that interprets a data set in a generalized form suitable for interpretation by many different computer systems to create a display to a user, and a web page is such a data set in any generalized form, including a frame. A web browser is typically designed to interpret human-readable markup languages that describe the arrangement of web page constituents and present said arrangement to the computer user. Such markup language web pages are often sourced from a server computer over a computer network such as the Internet, using HTTP protocol, but other transmission protocols may be used, and web pages may originate from other places such as a storage device in the computer on which the web browser is executing.

The markup language described is preferably HTML but it can be any sequence of human readable computer instructions that are interpreted by a web browser to specify the arrangement of both useful information or entertainment and embedded computer programs (Java applets/ActiveX controls). Such currently known markup languages include SGML (Standard Generalized Markup Language), WML (Wireless Markup Language), HDML (Handheld Device Markup Language), and Extensible Markup Language (XML). Other similar languages, some of which are not called "markup" languages, are in development and still more will be developed in the future. For purposes of the present invention, the essential function of the markup language is that it allows an executable program, whether compiled or interpreted or semi-compiled to non human-readable byte-code which is then interpreted, to be loaded by the web browser as a constituent of a web page, and to automatically execute on the device without requiring attention or action by the user while the user is receiving information desired by the user from the web browser. The information typically includes visually displayed information including text, but that is not an essential component for purposes of this invention. The information could be entirely auditory, such as music or spoken words.

Markup languages are often accompanied by scripting languages such as JavaScript, JScript, VBScript, or ECMAScript that are human-readable instructions interpreted by the web browser/operating system in order to affect how each web page constituent appears and behaves as a function of time and as a function of user input such as keyboard and mouse movement or clicks. Such scripting languages are often used to coordinate the visual display or operation of the constituents of a web page. This is preferably done using the DOM (Document Object Model) whose essential function is to provide a standard definition of the relationships of various web page constituents and to provide a nomenclature that scripting languages may use to access them. Other similar languages, some of which are not called "scripting" languages, are in development and still more will be developed in the future.

For the purposes of the invention, the essential function of the script program is to cause programs on the client machine to detect and respond to keystrokes or mouse clicks that are sent to the web browser, web page, or web page constituents, and to operate on web page constituents in order to change their appearance, keyboard focus, or if they are embedded programs, to communicate messages to the programs.

It is common to imbed into a web page an audio/video playout program such as the Microsoft Media Player ActiveX control or RealPlayer ActiveX control. This allows the user to hear or view an audio/video work within the context of the web page without opening a separate application window for the audio/video player program.

Sometimes the player program will allow the user to control playout by dedicating certain keys as playout control keys such as pressing the letter "P" to pause or pressing the up or down arrows to increase or decrease volume. Traditional keyboard keys are usually used for these functions because most computers and operating systems do not have specialized keys and corresponding key codes for audio/video playout control. However, it is expected that playout programs will be designed to respond to such specialized keys as they become commonplace on keyboards, as in FIG. 3, or as auxiliary hand-held keypads, as in FIG. 2.

On computers and operating systems that do not have specialized audio/video control keys, it is common to add a specialized wireless keypad to a computer, and add a specialized program to receive data from said wireless keypad and translate it into the traditional keystrokes which are sent to an audio/video playout application in order to effect the desired playout control.

In the preferred embodiment of this invention, the keypad is an infrared remote such as those used to control traditional home entertainment electronics, and the infrared signals are translated to digital codes that are sent to a personal computer through the USB port. However, the remote may alternatively use radio frequency communication to transmit key press information, and the means of communication to a PC may be the serial port, IEEE 1394 port, IrDA port, ISA (Industry Standard Architecture) bus, PCI (Peripheral Component Interconnect) bus, BlueTooth, 802.11, or any other communications port or bus, including those that are still under development or may be developed in the future.

Regardless of whether the audio/video playout program detects traditional key events, or specialized audio/video key events, existing operating systems deliver both types of key events to the playout program in the same manner. That is, the window that has the keyboard focus will be the sole window to receive key events.

Optionally, the application window with keyboard focus may choose to pass key press events to its "parent" window—the window in which the application window resides. Common operating systems adopt the notion of child windows and parent windows, as shown in FIG. 4. The topmost window is typically called the "Desktop" window 19 and application displays 40, 44 have primary windows 41, 45 that are the child windows of the desktop window 19. In FIG. 4, the desktop window 19 is the parent to two child application windows 41, 45. Furthermore, any child windows, such as 41 and 45 may act as the parent windows to their own child windows. Windows 42 and 43 are child windows to the parent window 41. Windows 46 and 47 are child windows to the parent window 44. In this document, a parent window and its child windows (and their child windows, etcetera) will be referred to collectively as a "window family" designated by the name of the parent.

An essential function of this window hierarchy is to provide a clear sequence that describes how user input events, such as key presses or mouse clicks, are processed by applications. When a child window has the keyboard focus, it is the first window to receive key events from the operating system. This window then has the option to pass the key event to its parent window. The parent window may then act on the key event, sometimes by passing the event to its parent.

In the preferred embodiment, the operating system is Microsoft Windows 2000, but the invention applies to all operating systems that implement the same parent-child window hierarchy and share this system of key event propagation.

Most audio/video playout control programs exist as stand-alone applications. That is, they have their own primary application window 41, 45. This means that even if the application has a child window that has the keyboard focus, the parent window will receive key press notification from the child window as long each as child window passes key press events up to its parent window. To allow dedicated audio/video playout keys to function at all times, existing playout programs consist of only a primary application window or they ensure that every user-selectable child window passes playout control key events to its parent. Then the primary application window, when receiving key events, will always affect audio/video playout. In this way, as long as one of the application's windows has the keyboard focus, the desired playout control will occur as a result of playout key presses.

Web Page Embedded Playout Programs

This technique becomes less effective when the audio/video playout program is not a stand-alone application, but instead is embedded in a web page. As shown in FIG. 1, a web page embedded program window 50 is a child window of the web page window 13. This means that, unless the window of the web page embedded program has the keyboard focus, or one of its child windows has the keyboard focus, the embedded program will not receive keyboard events. For example, in the preferred embodiment, the web browser is Microsoft's Internet Explorer 5.5. In this web browser, when a web page is first opened, the web page window 13 automatically receives the keyboard focus. Since the embedded audio/video playout program window 50 is a child window of the web page window 13, it will not receive any key press events. This can be confusing to a user if the web page presents an audio/video work as the central constituent of the web page. Even for users who understand that the embedded programs must have the keyboard focus to receive key press events, it is inconvenient for the user to have to select the audio/video application in order to control playout using key presses. Web pages often consist of text, graphics, or hyperlinks that the user may want to click, for example to select text for copying, or to follow a hyperlink. This clicking action will cause the web page window 13 to receive the keyboard focus, and keyboard key events will no longer be delivered to the embedded application. This is particularly inconvenient for the users who may inadvertently set the keyboard focus to a window that is not the audio/video player application, and then step away from the computer and attempt to perform playout control using a hand-held remote keypad. Beyond the inconvenience, it may in fact be impossible or extremely difficult for the user to set the keyboard focus to the player program window 50 due to the fact that some web pages may choose to hide the player program window 50 from the user by setting its height and width dimensions to zero or some small number.

In order to solve this problem, two solutions are presented.

1. Embedded Program or Associated Script Frequently Requests Keyboard Focus

In a first embodiment of the invention, as shown in FIG. 1, the web-embedded audio/video application is the only web page constituent that needs to process and respond to key events. In this case, the embedded player includes instructions to continuously request they keyboard focus from the operating system/web browser. The rate is preferably slow enough to ensure minimized processor usage, but high enough to ensure lively user interface responsiveness, such as between 100 Hz and 1 Hz in an Intel Pentium processor running at 300 MHz. In this manner, even if the user clicks on a part of the desktop window 19 or a part of the web page window 13 outside of the audio/video program window 50, the keyboard focus will quickly be redirected to the proper program window 50. There may, in fact be other embedded programs on this web page which are capable of receiving the keyboard focus by user-specification. However, as long as those programs do not need to react to keyboard input, it is not a problem for the user if the keyboard focus is immediately reassigned to the audio/video playout program window.

While some operating systems and web browsers, such as Windows 2000 and Internet Explorer 5.5, allow the embedded application itself to obtain the keyboard focus by request, it is also possible to use a scripting language to cause the web browser to set the keyboard focus to a specific web page constituent. Thus, in a preferred embodiment, the JavaScript language instructs the web browser to set the keyboard focus to the embedded audio/video program window 50 on a continual basis.

Note that in this solution, the embedded application does not include instructions that may affect its keyboard focus relative to other web page constituents. Instead, the web browser, by interpreting the web page markup and scripting languages, will set the keyboard focus to the appropriate web page constituent. This is preferred because keyboard focus instructions are not included in the embedded program. This enables the same program to be used in a wide variety of web pages, allowing the web page composer freedom to determine with a script how and if the embedded audio/video application should have the keyboard focus. In this manner, the same audio/video application can be utilized on a wide number of web pages under different usage scenarios.

2. Browser and all Constituents Instruct Audio/Video Control Program

The above solution has a drawback when there are other web page constituents besides a playout control program to which the user may want to intentionally assign the keyboard focus. For example, in FIG. 1, a web page may incorporate a search function where the user may type in to a key entry window 101 that is a child window of the web page window 13 rather than the window of the playout control program. In this arrangement, it would be undesirable to continuously assign the keyboard focus to the playout control program window 50 because the user may want to place the keyboard focus in the text box window 101 in order to type in, for example, the title of an audio/video work that the user would like to see or hear. In this case, a better approach is to write scripting language instructions that instruct the browser to use a window within its window family to intercept and interpret key events intended for web page constituents that are not part of the embedded audio/video player program.

If the web browser were capable of redirecting key events that are directed to any child window of the browser window to an embedded program, it would be sufficient to use a script to cause the browser to simply capture all key events to all web page constituents, and redirect key events resulting from audio/video control key events to the audio/video player window 50. However, for security reasons, known web browsers do not allow scripting programs or embedded applications to communicate key or mouse events to other web page constituents (which is how a redirection of a key event would be done).

The solution of this invention is to place within the embedded audio/video control program a means for the scripting language to control playout by accessing "methods" of the audio/video program which are made available to the scripting language by way of the Document Object Model specification. The preferred implementation uses the JavaScript language to cause the browser to use one of the browser family windows to capture all key events, then detect whether each key event is from an audio/video control key and, in the event that it is, to activate the corresponding audio/video control action by calling the available methods of the web-embedded application.

However, although contemporary browsers are able to intercept key events sent to regular web page constituents such as text boxes, they are unable to intercept key events that are delivered directly by the operating system to web embedded programs which may have their own windows within the browser family of windows and may request the keyboard focus. In this case, each web embedded program on the web page that may have the keyboard focus must be written to detect audio/video control key events and then notify the web-embedded audio/video player to perform the corresponding playout control action via the DOM method described above.

Use of Uncommon Text Key Codes

An important extension of the invention for both of the above embodiments addresses the problem that most existing web browsers and operating systems do not have specialized key codes for audio/video playout control keys. In this case, existing audio/video playout programs use traditional keys, such as "P" for play, "S" for stop, etc. to control playout. Another reason to use such keys is that browsers and scripting languages of present operating systems may not yet be capable of processing audio/video control keys.

However, using traditional keyboard buttons to control audio/video playout presents problems for the embodiments presented above. This is because these keys may be needed to indicate input into another web page constituent, such as a text box, for purposes other than playout control. If a playout control key is pressed while entering text data, playout control will inadvertently be activated.

An extension to the invention solves this problem by using key codes that the browser and scripting language can process, but that would not normally be used when typing into a text box. The following table is an example of such key codes:

| Playout Control Button | Substitute Character Representation | ASCII Code |
| --- | --- | --- |
| PLAY | { | 123 |
| STOP | } | 125 |
| PAUSE | \| | 124 |
| VOLUME UP | ^ | 94 |
| VOLUME DOWN | _ | 95 |
| REWIND | < | 60 |
| FAST FORWARD | > | 62 |

Thus, a JavaScript program can intercept these keys when typed into a text box and perform the corresponding playout control action using the Document Object Model to access the playout program. As described above, any other embedded program designed to receive text input should be written to receive the input from the browser in the form of a DOM command rather than key events from the operating system so that these unusual characters will not appear as text in the program. Alternatively, the script program should cancel the key event, if possible, to ensure that it is not also interpreted as a key that is intended for the text box. Otherwise the character will appear in the box and confuse the user.

Using such non-traditional key characters for playout control might at first be considered confusing to the user. However, the intention of this invention is for it to be used in conjunction with a specialized "wedge" program that interfaces with the audio/video playout control keyboard and translates each detected key-press to the key events in the table above. Thus, the user does not need to remember these specialized key codes. Instead the user simply presses a playout control key, which is translated to the proper key code and delivered to the window that has the keyboard focus.

A problem that arises here is that a web page composer may wish to embed an audio/video playout program that does not detect specialized keys such as those presented in the above table but nevertheless can obtain the keyboard focus if selected by the user. Such as program would be designed to work with non-key event controls as described above. If such a program were used with the above system and the user were to explicitly set the keyboard focus to the audio/video playout program and then press a playout control key, nothing would happen. The playout program would not recognize these keys, and contemporary web page script programs cannot intercept key events directed to embedded programs.

A solution to this problem is to write the web page script such that if the audio/video playout window receives the keyboard focus, the script will immediately reassign the keyboard focus to the web page window 13 so that the above described processes can take over.

Control of Audio/Video Keyboard Focus Whether Inside or Outside of a Web Browser.

Unfortunately, none of the above embodiments solves the problem of a user wanting to enter text input in one program window, and send audio/video keyboard input to a different program window without changing the text keyboard focus. For example (see FIG. 5), the user may want to execute a word processing program 70 in the foreground, and at the same time execute audio/video playout programs in background windows 72, 73. A user might work at the computer using the word processor program, but occasionally step away from the computer and desire to use an audio/video control keypad to control a background audio/video playout program. Or one user may be word processing on the computer while a cohort controls a background audio/video playout program using a hand-held remote.

The following embodiments of the invention allow the audio/video keyboard focus to be set to any number of computer program windows. This is accomplished by treating the audio/video keyboard focus as a separate keyboard focus that is not set in the same way as the text keyboard focus. In the following embodiments, any number of computer programs can receive the audio/video keyboard focus without requiring reassignment of the text keyboard focus. Such programs may be embedded in a web page 73 or they may execute as applications 72 that are independent of a web browser. In these embodiments, one program may have the audio/video keyboard focus, while another program maintains the text keyboard focus. Thus, audio/video control key events are delivered to a single audio/video playout program 72 or 73, and text keystrokes are delivered in the common way to the foreground window 70 that has the text keyboard focus.

3. Multiple Keyboard Focuses Added to Existing Operating Systems

For security reasons, modern operating systems such as Windows 2000 do not allow programs to send key events to any window except the foreground window, nor do they allow programs to change the text keyboard focus between executing programs. Additionally, operating systems that have key event codes for audio/video control keys deliver such event codes to the window with the keyboard focus. Thus, to communicate audio/video control key events to a window that does not have the keyboard focus, it is necessary to deliver audio/video key events by another means.

In a preferred embodiment, Microsoft's Component Object Model (COM) is used for auxiliary key event delivery. However, other inter-process communication methods, such as shared memory, pipes, sockets, CORBA, RMI, or Microsoft's general-purpose window message passing, may be used instead.

In existing computers with audio/video keyboards, the wedge program receives information from the audio/video key hardware and translates that information into key events that are delivered to the operating system, which in turn delivers the key events to the window that has the keyboard focus. In this embodiment of the invention, as shown in FIG. 5, to deliver key events to various program windows, the wedge program 71 uses Microsoft COM 74. First, the wedge program must know which programs are able to receive audio/video key events (herein referred to as "event client" programs 72, 73). Since there may be any number of such programs, at startup each event client uses the COM architecture to locate and register its existence with the wedge "server" program 71. In this way, the wedge server 71 can keep track of all programs that are capable of receiving audio/video key events. An important part of this registration process is that the client program 72, 73 provides the wedge server with information (sometimes called a "reference", "handle", or "pointer") that allows the wedge server 71 to find and pass key event information to the event client program 72, 73. By keeping a reference to every program that needs to receive audio/video key events, the wedge server 71 can deliver key events to any one of these known key event clients 72, 73. Similarly, an event client program 72, 73 notifies the wedge server when it would like to be removed from the list of event client programs. This is typically done when the event client program terminates execution. Alternatively, the wedge server may remove the event client from its list upon detecting that the event client program is no longer executing.

When an audio/video key is pressed, only one of the event client programs is notified of the key event, and this program is considered to have the "audio/video keyboard focus". This simplifies the user interface by ensuring that a single audio/video key-press controls only one audio/video playout program at a time. Accordingly, there must be a means of specifying which program is to receive the audio/video keyboard focus.

The default behavior is for the audio/video keyboard focus to be assigned to the same window that has the text keyboard focus. That is, when the user sets the text keyboard focus to a program window, that program window also receives the audio/video keyboard focus. This is a desirable default behavior because it frees the user from having to think about the assignment of the audio/video keyboard focus most of the time. However, the user may override this default behavior in order to set the audio/video keyboard focus to a window other than the window with the text keyboard focus.

To implement the above method, the wedge server 71 in default mode sends audio/video key events to the operating system, which passes them to the window with the text keyboard focus. When the user selects a particular window to retain the audio/video keyboard focus (for example, by mouse-clicking on a designated button in that window), the wedge server uses the COM protocol to pass audio/video key events to the application specified by the user, regardless of which application window in the foreground has the text keyboard focus.

There are several user interfaces that can allow the user to specify which window is to retain the audio/video keyboard focus. One method is for each event client program to present the user with a mouse-clickable button that, when activated, causes the event client 72, 73 to notify the wedge server 71 program that audio/video key events should be delivered only to that event client program. However, this method has the drawback that a malicious event client program may notify the wedge server that it is to hold the audio/video keyboard focus even if the user has not requested this behavior.

An alternative user interface eliminates this problem by having the user interact with the wedge server 71 program window in order to specify which program is to receive the audio/video keyboard focus. Each event client program, when registering its existence with the wedge server, specifies a word or phrase that identifies the program to the user (preferably, the word or phrase in the program's main window title bar). The user then observes the wedge server 71 window which displays a list of programs that may hold the audio/video keyboard focus. The user indicates which one of these programs is to hold the audio/video keyboard focus by moving the mouse over the corresponding identifying phrase and clicking the mouse.

Regardless of the user interface presented to the user, when the user specifies a window to hold the audio/video keyboard focus, any other window that presently has the audio/video keyboard focus immediately loses the focus in favor of the more recently specified window. Also, there is a user interface means for the user to specify that the audio/video focus should return to the default mode where the audio/video keyboard focus is the same as the text keyboard focus. This can be accomplished several ways, such as including a mouse-clickable button in the wedge server 71 window that causes the server to enter the default mode. Or the same user interface that is used to specify the selection of the audio/video focus may be used to turn off the focus to that window. That is, if the user selects a window for the audio/video keyboard focus that already has the focus, this is interpreted as a desire to turn the focus off of that window, and enter the default mode.

Thus, according to the above methods, the user may turn the audio/video keyboard focus on or off for any audio/video key event client program, and only one such application may hold the audio/video keyboard focus at any time.

4. Multiple Keyboard Focuses Built into an Improved Operating System

It is common for text keyboard focus and key event processing to be built into the operating system so that another program running on the operating system cannot maliciously change text keyboard focus from the user's specification. In the embodiment described above, the wedge server and event client programs are not built into the operating system, thus they are subject to interference from other programs. Furthermore, the above embodiment requires significant work on the part of playout program developers in order to ensure that their programs comply with the wedge server event delivery architecture. Also, the above embodiment requires special registration methods to allow the wedge server program to gain a reference to each application that may receive audio/video key events. In contrast, the operating system is responsible for loading computer programs, thus it already has a means of finding and passing information to all executing programs.

Thus, in a preferred embodiment, the audio/video keyboard focus is incorporated directly into the operating system, so that neither the user, nor another program may inadvertently or intentionally misdirect the delivery of audio/video key events or the assignment of the audio/video keyboard focus.

In this preferred embodiment, audio/video key events are delivered in a similar manner as regular text keyboard events. This means that programs running on the operating system require minimal additional programming effort in order to interpret audio/video key events, since they can use the same software architecture as regular key event processing. Audio/video keyboard focus selection is built into the operating system to prevent malicious programs from changing the audio/video focus to a window that was not specified by the user.

In contrast to existing operating systems, the audio/video keyboard focus behaves in the manner described by the previous embodiment. That is, by default the audio/video keyboard focus follows the text keyboard focus. However, the user may set the audio/video keyboard focus to another computer program. For example, in Microsoft Windows the text keyboard focus can be set by moving the mouse over a program window and clicking the left mouse button. If the right button is clicked, a "pop-up" window displays various actions to perform on that window (such as minimize, close, or maximize). One of such options could be to hold the audio/video keyboard focus. Alternatively, just as most programs include mouse clickable buttons in their title bars in order to minimize, maximize or close the window, an additional button may be included to turn on or off the audio/video focus to that window. Or a special key or combination of keys (such as Ctrl-Alt-Insert) may be pressed while the desired window is in the foreground, which causes the foreground window to hold the audio/video focus if another window is subsequently assigned the text keyboard focus. Alternatively, a special key or combination of keys may be reserved to cycle through all executing computer programs that can receive the audio/video focus, where each time the special key is pressed, the next executing program is assigned the audio/video focus (perhaps indicated visually by a different color window border). This particular approach is most usefully applied using the keys on a hand-held keypad so that the audio/video focus can be selected from a distance without using the mouse or text keyboard.

Distinction Between Local Key Presses and Remote Key Presses

Contemporary computer systems may include either a keyboard designed for short-range (local) usage (such as a traditional text keyboard as in FIG. 3) or a keyboard designed for long-range (remote) usage (such as a hand-held remote as in FIG. 2) or both such keyboards. Systems with such dual keyboard capabilities make no attempt to indicate to audio/video playout programs whether a key press occurred on a short-range keyboard versus a long-range keyboard.

This is valuable information to a playout program, because a different mode of operation may be desirable depending on which keyboard is being used. For example, a video playout program may automatically enter a full-screen mode if it detects that the user has pressed a key on a long-range (remote) keyboard. Or an audio playout program may temporarily display a large on-screen indicator (more easily viewable from a distance) of the audio output volume if a volume adjustment key is pressed on a long-range keyboard.

Rather than requiring the user to notify a program to increase its display size if a long-range keyboard is being used (as would be done on common systems), it is better if the program is notified with each key-press whether the key originated from a short-range or long-range keyboard. This is accomplished by adding just one bit to each key event message. A "one" bit indicates that the key originated from a long-range keyboard, and a "zero" bit indicates that the key originated from a short-range keyboard. Alternatively, an entirely new set of key codes may be used for each key on a long-range keyboard, if those keys exist in duplicate on short-range keyboards.

In this manner, the user may easily switch between short-range keyboard use and long-range keyboard use, and the playout program is notified of this change by each new key press.

There are several ways to improve a computer program's user interface if the program is able to detect the difference between local versus remote key presses. For example, the user may run a video playout program that displays a video clip in a window. When a remote key press is detected, the program enlarges the video to occupy the entire screen to make long-range viewing easier. This is done until a local key press is detected, and the playout program returns to its original size and location on the screen. Or a user may run an audio playout program that normally displays its volume setting in a small graphical indicator. When the user presses a remote button to change the volume, the program displays a large, full-screen volume indicator that can be seen from large distances. This indicator is displayed for a programmable amount of time (for example 0.5 to 5 seconds) in order to allow the user to see the volume setting. After this pre-programmed time elapses, the program no longer displays the large volume indicator, so that other on-screen graphics may be viewed more easily. This same method can be employed when the user presses buttons to fast-forward or rewind an audio/video clip. In this case, the on-screen indicator is a large horizontal "progress bar" whose degree of opaqueness indicates the current point of playout in the clip. That is, if the song is halfway through playout, the progress bar is half opaque, and the other half is the screen's background color.

The above described embodiments of the invention are only examples. Many other embodiments are possible. The scope of the invention should not be limited to the above embodiments but should only be limited by the following claims:

We claim:

1. A method for controlling a media player in a processor-based system, comprising:
    causing the processor-based system to receive, with respect to a program capable of executing web page script, information representing human selection of a key made via a user interface device;
    causing the processor-based system to compare, responsive to an event handling script executed by the program, whether the received information corresponds to one or more event values associated with the media player, each event value representing selection of a single audio or visual control command to be executed by the media player; and
    in response to detected correspondence between the received information and a value of the one or more event values associated with the media player, causing the processor-based system to call a function of the media player to execute the corresponding control command.

2. The method of claim 1, wherein:
    said method further comprises, if there is no detected correspondence between the received information and the value of the one or more event values, otherwise causing the processor-based system to provide the information to the program, for interaction with content to be displayed by the processor-based system using the program.

3. The method of claim 2, wherein:
causing the processor-based system to compare comprises causing the processor-based system to compare a value of the key corresponding the human selection with a list representing one or more predetermined keys;
causing the processor-based system to call the function comprises causing the processor-based system to convert the value of the key to a predetermined audio or visual control command associated with the value of the key, and to provide the predetermined audio or visual control command to the media player; and
otherwise causing the processor-based system to provide comprises causing the processor-based system to provide the value of the key to the program for interaction with the content to be displayed by the processor-based system using the program, while withholding from the media player the predetermined audio or visual control command.

4. The method of claim 3, wherein causing the processor-based system to call the function further comprises withholding the value of the key from interaction with the content to be displayed by the processor-based system using the program.

5. The method of claim 2, wherein otherwise causing the processor-based system to provide comprises causing the processor-based system to provide an ASCII character to the program corresponding to the value of the key.

6. The method of claim 2, wherein the program comprises two or more windows that are to be displayed by the processor-based system, and wherein otherwise causing the processor-based system to provide comprises causing the processor-based system to:
identify a first one of the one or more windows which is to have focus; and
provide the value of the key to the first one for interaction with content, and withhold the value of the key from at least one second window of the two or more windows.

7. The method of claim 1, wherein:
causing the processor-based system to receive further comprises causing the processor-based system to convert the value of the key into an ASCII character; and
causing the processor-based system to compare comprises causing the processor-based system to compare the ASCII character with the one or more event values.

8. The method of claim 1, wherein the value of the key corresponds to a media control key of a handheld remote control.

9. The method of claim 1, wherein the value of the key corresponds to a computer keyboard character, and wherein causing the processor-based system to compare comprises causing the processor-based system to compare the computer keyboard character with the one or more event values.

10. The method of claim 1, wherein causing the processor-based system to call a function of the media player comprises causing the processor-based system to call a function written according to the domain object model (DOM), in order to invoke the corresponding control command.

11. An apparatus comprising instructions stored on non-transitory machine-readable, the instructions when executed to cause a processor-based system to:
receive, with respect to a program capable of executing web page script, information representing human selection of a key made via a user interface device;
compare, responsive to an event handling script executed by the program, whether the received information corresponds to one or more event values associated with the media player, each event value representing selection of a single audio or visual control command; and
in response to detected correspondence between the received information and a value of the one or more event values associated with the media player, call a function of the media player to execute the corresponding control command.

12. The apparatus of claim 11, wherein the instructions when executed are to cause the processor-based system to:
if there is no detected correspondence between the received information and the value of the one or more event values, otherwise provide information input by a human via a user interface to the program, for interaction with content to be displayed by the processor-based system using the program.

13. The apparatus of claim 12, wherein the instructions when executed are to cause the processor-based system to:
compare a value of the key representing the human selection with a list representing one or more predetermined keys;
in response to correspondence between the received information and the one or more predetermined keys,
convert the value of the key to a predetermined audio or visual control command associated with the value of the key, and
provide the predetermined control command to the media player; and
otherwise provide the value of the key to the program for interaction with the content to be displayed by the processor-based system using the program, and withhold from the media player the predetermined audio or visual control command.

14. The apparatus of claim 13, wherein the instructions when executed are to cause the processor-based system to, in response to correspondence between the received information the one or more predetermined keys, withhold the value of the key from interaction with the content to be displayed by the processor-based system using the program.

15. The apparatus of claim 13, wherein the instructions when executed are to cause the processor-based system to, if the comparison yields no correspondence between the received information and the one or more predetermined keys, provide an ASCII character to the program corresponding to the value of the key.

16. The apparatus of claim 11, wherein the program comprises two or more windows that are to be displayed by the processor-based system, and wherein the instructions when executed are to cause the processor-based system to, if the comparison yields no correspondence between the received information the one or more event values:
identify a first one of the one or more windows which is to have focus; and
provide the value of the key to the first one for interaction with content, and withhold the value of the key from at least one second window of the two or more windows.

17. The apparatus of claim 11, embodied in a device comprising the processor-based system, the program and the media player, the program and the media player stored by the device in processor-accessible non-transitory storage.

18. The apparatus of claim 11, wherein the apparatus further comprises the user interface device, wherein the user interface device is a remote control, and wherein the value of the key corresponds to a media control key of the remote control.

19. The apparatus of claim 18, wherein the remote control is a wireless remote control, and wherein the apparatus further comprises a transmitter embodied in the wireless remote control and a receiver that is part of the processor-based system, and wherein the transmitter and the receiver both employ one of a Bluetooth, an infrared or a radio frequency (RF) transmission scheme.

20. The apparatus of claim 19, wherein the instructions when executed are to cause the processor-based system to:
convert the value of the key represented by the received information into an ASCII character; and
compare the ASCII character with the one or more event values in order to detect the correspondence.

21. An apparatus, comprising:
a processor-based system; and
non-transitory storage for a program and a media player;
wherein the processor-based system is to
receive, with respect to a program capable of executing web page script, information representing human selection of a key made via a user interface device,
compare, responsive to an event handling script executed by the program, whether the received information corresponds to one or more event values associated with the media player, each event value representing selection of a single audio or visual control command, and
in response to detected correspondence between the received information and a value of the one or more event values associated with the media player, call a function of the media player to execute the corresponding single audio or visual control command.

22. The apparatus of claim 21, wherein the processor-based system is to:
if there is no detected correspondence between the received information and the value of the one or more event values, otherwise provide information input by a human via a user interface to the program, for interaction with content to be displayed by the processor-based system using the program.

23. The apparatus of claim 21, wherein the processor-based system is to:
compare a value of the key representing the human selection with a list representing one or more predetermined keys;
in response to correspondence between the received information and the one or more predetermined keys,
convert the value of the key to a predetermined audio or visual control command associated with the value of the key, and
provide the predetermined audio or visual control command to the media player; and
otherwise provide the value of the key to the program for interaction with the content to be displayed by the processor-based system using the program, and withhold from the media player the predetermined media player command.

24. The apparatus of claim 21, wherein the processor-based system is to, if the comparison yields no correspondence between the received information and the one or more predetermined keys, provide an ASCII character to the program corresponding to the value of the key.

25. The apparatus of claim 21, wherein the program comprises two or more windows that are to be displayed by the processor-based system, and wherein the processor-based system is to, if the comparison yields no correspondence between the received information the one or more event values:
identify a first one of the one or more windows which is to have focus; and
provide the value of the key to the first one for interaction with content, and withhold the value of the key from at least one second window of the two or more windows.

26. The apparatus of claim 21, wherein the apparatus further comprises the user interface device, wherein the user interface device is a remote control, and wherein the value of the key corresponds to a media control key of the remote control.

27. The apparatus of claim 26, wherein the remote control is a wireless remote control, and wherein the apparatus further comprises a transmitter embodied in the wireless remote control and a receiver that is part of the processor-based system, and wherein the transmitter and the receiver both employ one of a Bluetooth, an infrared or a radio frequency (RF) transmission scheme.

28. The apparatus of claim 21, wherein the processor-based system is to:
convert the value of the key represented by the received information into an ASCII character; and
compare the ASCII character with the one or more event values in order to detect the correspondence.

* * * * *